Jan. 18, 1949.  A. B. CUMMINS  2,459,685
MANUFACTURE OF STRUCTURAL SHAPES
Filed May 3, 1944
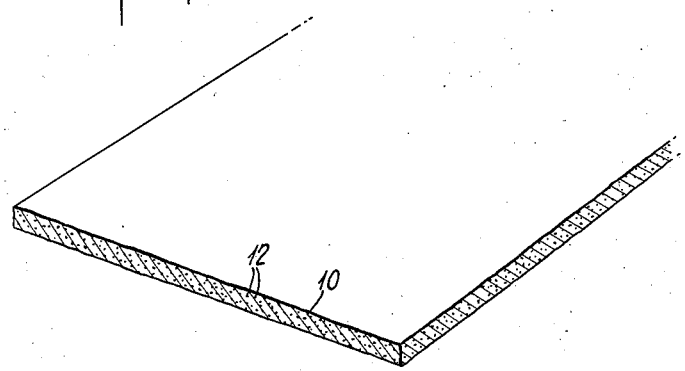
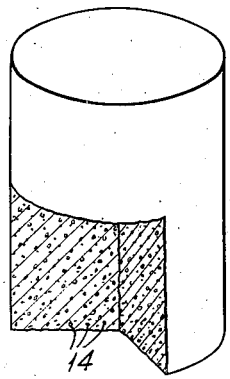
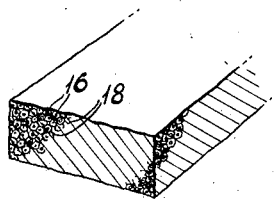
INVENTOR
ARTHUR B. CUMMINS.
BY Virgil C. Kline
ATTORNEY Patented Jan. 18, 1949

2,459,685

UNITED STATES PATENT OFFICE 2,459,685

MANUFACTURE OF STRUCTURAL SHAPES

Arthur B. Cummins, Plainfield, N. J., assignor to Johns-Manville Corporation, New York, N. Y., a corporation of New York Application May 3, 1944, Serial No. 533,971

2 Claims. (Cl. 106—40)

This invention relates to the manufacture of light weight structural shapes, and more particularly to strong micro-porous heat refractory shapes and a method of manufacturing the same.

Products of the type of natural meerschaum have been heretofore employed for the manufacture of lamp bases, tobacco pipes and similar articles. Natural meerschaum has certain inherent characteristics including low density, fine surface texture and workability by cutting tools, which particularly adapts it for reception of carving and decorative finishes. Natural meerschaum is, however, a comparatively rare and structurally weak product; and artificial meerschaums as heretofore manufactured lack the uniform micro-porous structure, high structural strength and volume stability over wide temperature ranges which would adapt them for industrial uses such as building tiles and heat refractory articles.

An object of the present invention is to provide an artificial meerschaum type product of uniform micro-porous structure which possesses sufficient structural strength and heat refractory characteristics as to make it attractive for industrial uses.

Another object is to provide an improved method of manufacturing artificial meerschaum shapes of uniform texture, micro-porous structure and of good structural strength and volume stability at high temperatures. Other objects and features of the present invention will appear from the following detailed description.

Structural and heat refractory shapes such as form the subject of the present invention are illustrated in the accompanying drawings, in which:

Fig. 1 is a perspective view, partly in section, of a structural tile of uniform micro-porous structure;

Fig. 2 is a diagrammatic perspective view on a greatly enlarged scale of a cylindrical shape having a composition and structure adapted for use as a catalyst carrier; and Fig. 3 is a diagrammatic representation on a magnified scale illustrating a modification of the composition and its effect on the micro-porous structure.

Artificial meerschaum type structural shapes such as illustrated in the drawings have as their principal ingredient a substantially anhydrous magnesium silicate in which the molal ratio of magnesia to silica preferably lies within the range 1–2:3. The general method of manufacture may include the steps of forming a slurry of finely divided silica or a silicate such as sodium silicate and finely divided magnesia or magnesia salts such as magnesium carbonate; heating the slurry under conditions designed to promote reaction between the silica, water and magnesia components to form a hydrated magnesium silicate; washing or otherwise treating the crystalline product of the reaction to remove undesirable by-products such as soluble alkali metal compounds; molding, extruding or otherwise shaping an aqueous paste of the finely divided hydrous magnesium silicate; drying the resulting shapes to remove free moisture; and finally firing the shapes to temperatures in the range 1500–2300° F. to liberate the combined water and to develop high structural strength and heat refractory properties, together with suitable micro-porosity.

Structural or decorative tiles such as portrayed in Fig. 1 may be molded under hydraulic pressure in a filter mold and thereafter dried and fired to a temperature of at least approximately 1500° F. During the operation of firing the molded shape actually shrinks in volume, but after the firing operation the product retains structural micro-porosity sufficient to enable it to absorb a substantial proportion of its weight of water. The fired product has a block density of 60–120 lbs. per cubic ft., and exhibits a transverse strength of at least 200 lbs. per square inch. Structurally the product consists of fine grains 10 of magnesium silicate, such grains being spaced by small capillary interstices 12 which are apparently developed at least in part by liberation of combined water during the firing operation. Metallic oxide pigments may be incorporated in the tiles of Fig. 1 to enhance their value for decorative wall linings.

Cylindrical shapes such as shown in Fig. 2 are preferably formed by extrusion, and may be advantageously employed as catalyst carriers of high mechanical strength and high heat refractory properties. When fired to 2100° F., very hard products are produced having a porosity measured by water absorption of about 14–15%, a density of approximately 108 lbs. per cubic ft. and a transverse strength or modulus of rupture of about 625 lbs. per square inch. Such shapes may incorporate in their structure up to 10–15% by weight of finely divided metal or metal oxide catalyst particles 14.

While the structural shapes preferably consist chemically of at least approximately 90% magnesium silicate, the proportion of magnesia to silica may be varied over a substantial range. Very satisfactory products are obtained when the magnesium silicate is formed by chemical reaction of precipitated basic magnesium carbonate and micro-porous diatomaceous silica, in the presence of water. When a molar excess of one of the reaction components is used, for example, diatomaceous silica, the cellular structure of the resulting fired product, when viewed microscopically, apparently consists essentially, as portrayed in Fig. 3, of finely divided unreacted diatomaceous silica particles 16 each of which is coated with and bonded by a skeletal matrix 18 of magnesium silicate.

A preferred method of manufacturing the structural shapes to develop maximum strength and micro-porosity, contemplates the use of finely divided reactive silica and finely divide magnesium carbonate. The magnesium carbonate component of the product is a finely divided precipitate of basic magnesium carbonate, such precipitate consisting of a light weight material having a relatively high specific surface area. The silica component of the product is preferably a highly reactive micro-porous silica such as diatomaceous earth or other form of amorphous opaline silica. Such silica is milled to pass a 20 mesh screen, and preferably to a fineness greater than 100 mesh, before being incorporated in the aqueous slurry from which the final product is produced.

According to this preferred method of manufacture, the reactive diatomaceous silica and a basic magnesium carbonate precipitate should be mixed in proportions such as to give a molal ratio of magnesia to silica within the range .35–.70 to 1. In preparing a slurry of the finely divided silica and precipitated magnesium carbonate, water is added in amount approximating at least .8 to 1 gallon of water per pound of slurry solids. To facilitate rapid reaction of the silica and magnesium carbonate components of the slurry, a small amount (not to exceed 0.5 molal ratio based on the silica present) of water soluble alkali metal compound is preferably added to the slurry to serve as a silica carrier. This alkali salt, such as sodium carbonate, does not enter into the reaction between the silica and the carbonate, except possibly as a carrier for putting the silica into a more reactive form, which may be a sodium silicate.

The slurry is heated to a temperature and for a time sufficient to effect reaction between a major proportion of the magnesia and silica components to form hydrous magnesium silicate. The reaction may be effected by simply boiling the slurry at atmospheric pressure over a period of 6–8 hours. The reaction is speeded up by the presence of sodium carbonate or other soluble alkali salt, and the reaction time can be reduced to a period not exceeding 1–1½ hours by carrying out the reaction at a higher temperature as, for example, in an autoclave under a pressure of say 100 lbs. per square inch. During the reaction, carbon dioxide is liberated at a rate which is proportioned to the speed of reaction between the magnesium carbonate and the silica. When the reaction is carried out under super-atmospheric pressure, provision must be made for liberating the carbon dioxide continuously or periodically, as by the use of relief valves.

After digesting the slurry for a sufficient time to react the silica and carbonate to the desired extent, the slurry should be filtered or otherwise treated to separate the solid reaction products from any alkaline slurry liquid. The solid products are preferably washed with water to remove undesirable alkaline impurities. The washed solid products are then mixed with fresh water to form a thick paste having a consistency suitable for extrusion or pressure molding to a desired shape. A paste suitable for molding usually incorporates water and solid products of the reaction in the proportions of about 110% of water, based on the weight of the solids. The extrusion or molding operation is preferably carried out under high pressures in the range of say 1000–2500 lbs./sq. in. Prior to firing the extruded or molded shapes are dried to drive off free water. Such drying may be carried out at atmospheric pressure and at a temperature not exceeding 250° F., or under a vacuum in the neighborhood of 150° F. On subsequently firing the dried shape to a temperature of 1500–2100° F., the combined water is driven off to produce a substantially anhydrous product.

As illustrative of the effect of variations in firing temperatures on the properties of the product, the following example is presented: A finely divided precipitate of basic magnesium carbonate, produced by boiling a magnesium bicarbonate solution or a suspension of normal carbonate, was mixed with finely divided diatomaceous silica and water to form a thin slurry in which the molal ratio between the magnesia and silica was approximately 1 to 2. The slurry was then boiled or digested in a closed autoclave under a pressure of 100 lbs./sq. in. steam pressure, while gradually bleeding off carbon dioxide liberated during the reaction between the carbonate and silica to form hydrous magnesium silicate. After carrying on this digestion for approximately 1 hour, the solid products of the reaction were filtered and washed with fresh water to remove a small amount of caustic alkali salt employed as an accelerator of the reaction. The resulting finely pulverized product was then mixed with fresh water in the proportion of 100 parts by weight of powder to 110 parts of water, forming a stiff paste which was charged into molds and compressed to a preform shape by applying a pressure of approximately 2330 lbs. per square inch. The preform shapes were dried by slow heating to a temperature of about 230° F. to drive off uncombined water. The dried shapes were then heated in a calcining oven to temperatures ranging from 1500° F. to 2300° F. A shape fired to 1500° F. had a density of approximately 60 lbs. per cu. in. and a transverse strength or modulus of rupture of approximately 220 lbs. per square inch. The porosity of this shape in terms of water absorption was about 47.5%. Another preform shape fired to 2000° F. had a density of about 93 lbs. per cu. ft. and a transverse strength of approximately 470 lbs. per sq. in. Still other shapes fired to 2300° F. had a density of 125 lbs. per cubic ft. and a transverse strength of 1315 lbs. per sq. in.

The color of the products generally ranges from a light gray for the shape fired at 1500° F., through a light pink, to a light yellow for the 2300° F. product. Pure white products can be produced by careful selection of the silica employed. As the firing temperature increased, the hardness, density and transverse strength of the products increased and the porosity decreased. The shapes fired to temperatures within the range 1900–2100° F. have a micro-porosity approximating that of natural meerschaum and are very much stronger and more heat stable. No substantial adverse effect on the density and strength of the product results from incorporating therein, prior to shaping, small amounts of mineral pigments. Products of increased strength are produced by incorporating into the mixture, prior to molding, up to 15-20% of reinforcing fibers of the type of mineral wool or asbestos. Denser products for a given firing temperature may also be produced by increasing the ratio of magnesia to silica in the original molding mixture.

Since many variations may be made from the illustrative details given, without departing from the scope of the invention, it is intended that the invention should be limited only by the terms of the claims interpreted as broadly as consistent with novelty over the prior art.

What I claim is:

1. A method of manufacturing hard, microporous shapes which are substantially volume stable at temperatures below 1500 F. which comprises, forming crystalline hydrous magnesium silicate by reacting magnesia and finely divided micro-porous silica in the molal ratios of 1-2:3 and in the presence of water, forming a stiff aqueous paste of the resulting finely divided hydrous magnesium silicate, molding said paste under pressure, and finally drying the resulting shape and firing it to a temperature of at least 1500° F.

2. A method of manufacturing hard, micro-porous shapes which comprises, forming an aqueous slurry of a finely divided basic magnesium carbonate and finely divided diatomaceous silica, said slurry containing magnesia and silica in the molal ratio of approximately 1-2:3, heating said slurry under pressure to effect reaction between the silica and the magnesium carbonate, forming a stiff paste of the finely divided hydrous magnesium silicate and water, shaping such paste under pressure, and finally drying and calcining the shaped articles to a firing temperature of 1500-2300° F.

ARTHUR B. CUMMINS.

REFERENCES CITED

The following references are of record in the file of this patent:

UNITED STATES PATENTS

| Number | Name | Date |
| --- | --- | --- |
| 1,049,005 | Steinmetz | Dec. 31, 1912 |
| 1,288,834 | Castor | Dec. 24, 1918 |
| 1,945,534 | Rembert | Feb. 6, 1934 |
| 2,203,614 | Goodwin | June 5, 1940 |

FOREIGN PATENTS

| Number | Country | Date |
| --- | --- | --- |
| 265,296 | Germany | 1913 |
| 334,858 | Germany | 1921 |
| 455,115 | Germany | 1927 |
| 642,056 | Germany | 1937 |